United States Patent [19]
Cuevas

[11] Patent Number: 5,927,804
[45] Date of Patent: Jul. 27, 1999

[54] VEHICLE OCCUPANT PROTECTION APPARATUS

[75] Inventor: Jess A. Cuevas, Scottsdale, Ariz.

[73] Assignee: TRW Inc., Lyndhurst, Ohio

[21] Appl. No.: 09/022,095

[22] Filed: Feb. 11, 1998

[51] Int. Cl.$^6$ ...................................................... B60N 2/42
[52] U.S. Cl. ........................ 297/216.12; 297/61; 297/408; 297/216.13
[58] Field of Search ................................ 297/61, 216.12, 297/216.13, 216.14, 406, 408

[56] References Cited

U.S. PATENT DOCUMENTS

| | | | |
|---|---|---|---|
| 2,973,029 | 2/1961 | Schlosstein | 297/216.12 |
| 3,339,911 | 9/1967 | Brosius, Sr. . | |
| 3,420,572 | 1/1969 | Bisland . | |
| 3,713,694 | 1/1973 | Miller . | |
| 5,052,754 | 10/1991 | Chinomi . | |
| 5,181,763 | 1/1993 | Dellanno et al. | 297/408 X |
| 5,378,043 | 1/1995 | Viano et al. | 297/216.12 X |
| 5,484,189 | 1/1996 | Patterson . | |
| 5,669,661 | 9/1997 | Pajon . | |
| 5,694,320 | 12/1997 | Breed . | |
| 5,716,102 | 2/1998 | Ray et al. | 297/216.13 X |
| 5,823,619 | 10/1998 | Heilig et al. | 297/216.12 |
| 5,833,312 | 11/1998 | Lenz | 297/216.12 X |
| 5,836,648 | 11/1998 | Karschin et al. | 297/216.13 |

FOREIGN PATENT DOCUMENTS 2232726  1/1974  Germany ........................... 297/216.12

*Primary Examiner*—Laurie K. Cranmer
*Attorney, Agent, or Firm*—Tarolli, Sundheim, Covell, Tummino & Szabo

[57] ABSTRACT

An apparatus (10) comprises a vehicle seat (12) including a frame (20) and a headrest (14). A linkage (16) is connected between the frame (20) and the headrest (14) to move the headrest (14) relative to the frame (20) in a forward direction. The linkage (16) is actuatable under the influence of a rear-end vehicle crash force applied to the linkage (16) by an occupant of the seat (12). The apparatus (10) further comprises a motor (70) which is connected to the linkage (16) to actuate the linkage (16). The motor (70) is actuated in response to a frontal vehicle crash condition.

9 Claims, 3 Drawing Sheets

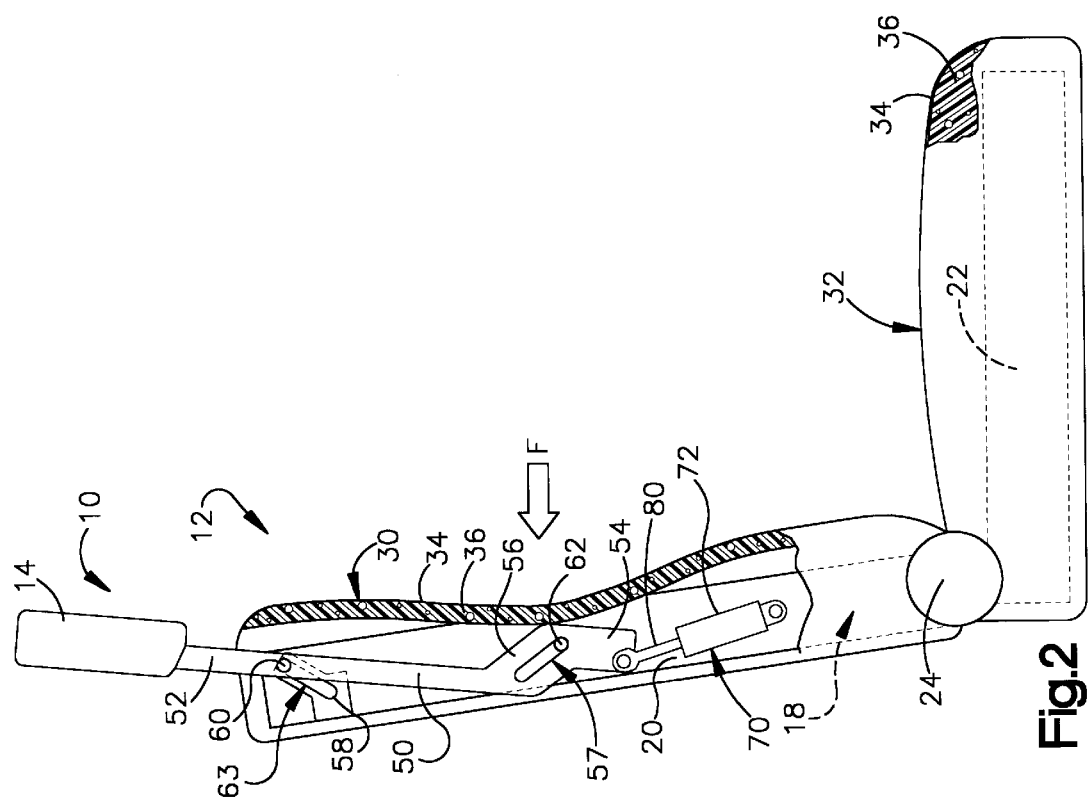
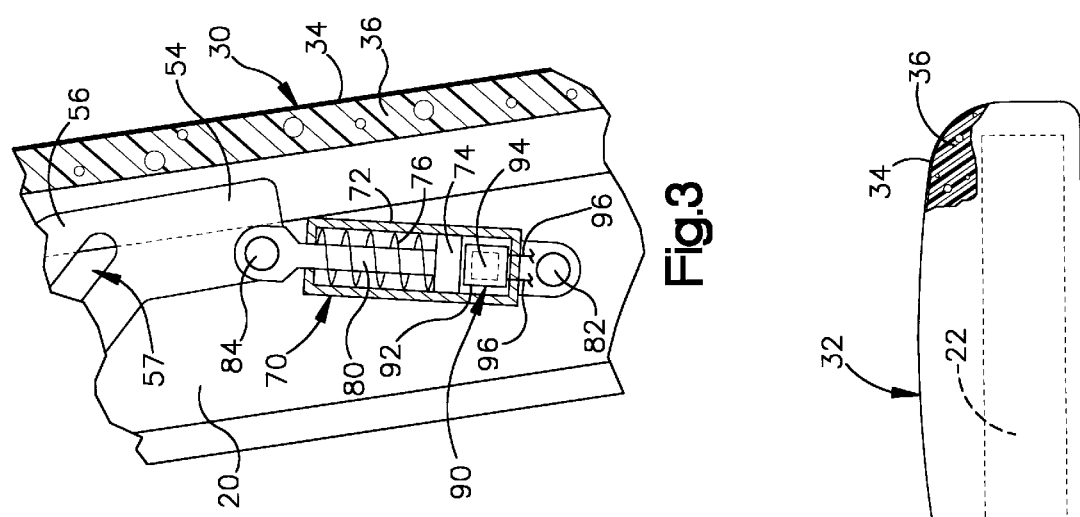
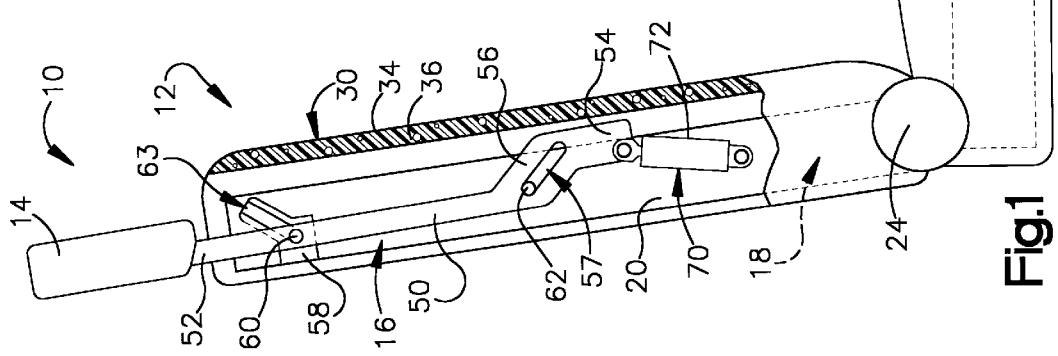

VEHICLE OCCUPANT PROTECTION APPARATUS

FIELD OF THE INVENTION

The present invention relates to a headrest for an occupant of a vehicle seat.

BACKGROUND OF THE INVENTION

A vehicle crash may cause an occupant of a vehicle seat to move in a rearward direction relative to the seat. A headrest on the seat can then be used to help restrain movement of the occupant's head.

SUMMARY OF THE INVENTION

In accordance with the present invention, an apparatus comprises a vehicle seat including a frame and a headrest. A linkage is connected between the frame and the headrest to move the headrest relative to the frame in a forward direction. The linkage is actuatable under the influence of a rear-end vehicle crash force imparted to the linkage by an occupant of the seat. The apparatus further comprises a motor which is connected to the linkage to actuate the linkage. An actuating means actuates the motor in response to a frontal vehicle crash condition.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 1 is a view of an apparatus comprising a first embodiment of the invention;

FIG. 2 is a view of the apparatus of FIG. 1 showing parts in different positions;

FIG. 3 is an enlarged, partly sectional view of parts of the apparatus of FIG. 1;

DESCRIPTION OF PREFERRED EMBODIMENTS

Figure 4:
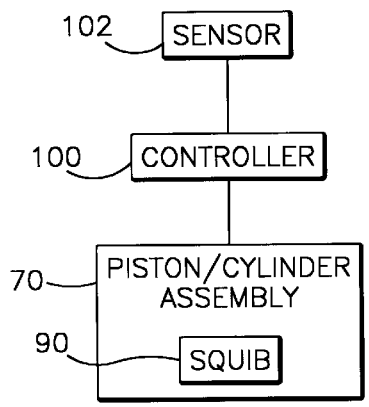
FIG. 4 is a block diagram of parts of the first embodiment of the invention.

An apparatus 10 comprising a first embodiment of the present invention is shown partially in FIGS. 1 and 2. The apparatus 10 includes a vehicle seat 12 with a headrest 14. A linkage 16 supports the headrest 14 for movement from the position of FIG. 1 to the position of FIG. 2. The headrest 14 is thus movable forward to help restrain rearward movement of the head of an occupant of the seat 12.

The seat 12 has a frame 18 with a back portion 20 and a bottom portion 22. A recliner assembly 24 (shown schematically) supports the back portion 20 of the frame 18 for inclination relative to the bottom portion 22. The recliner assembly 24 may be motorized or manually operated, as known in the art.

A back cushion 30 covers the back portion 20 of the frame 18, and a bottom cushion 32 covers the bottom portion 22 of the frame 18. Each of the cushions 30 and 32 is a deflectable structure comprising an outer layer 34 on a compressible base 36. The outer layers 34 are preferably formed of fabric or leather. The bases 36 are preferably formed of elastomeric foam.

The linkage 16 includes a vertically oriented lever arm 50 with upper and lower end portions 52 and 54. An intermediate portion 56 of the lever arm 50 extends upward and to the rear from the lower end portion 54. A slot 57 extending along the length of the intermediate portion 56 is inclined upward and to the rear relative to the back portion 20 of the frame 18. The headrest 14 is mounted on the upper end portion 52 of the lever arm 50.

A bracket 58 and a pair of vertically spaced-apart pins 60 and 62 support the lever arm 50 on the back portion 20 of the frame 18. The bracket 58 is fixed to the back portion 20 of the frame 18. A slot 63 in the bracket 58 is inclined upward and to the front relative to the back portion 20 of the frame 18. The upper pin 60 is fixed to the lever arm 50, and projects into the slot 63 in the bracket 58. The lower pin 62 is fixed to the back portion 20 of the frame 18, and projects into the slot 57 in the lever arm 50.

The apparatus 10 further includes a motor 70 for actuating the linkage 16. The motor 70 in the first embodiment of the present invention is a piston/cylinder assembly connected between the linkage 16 and the back portion 20 of the frame 18.

As shown schematically in FIG. 3, the piston/cylinder assembly 70 includes a vertically oriented cylinder 72 containing a piston 74 and a spring 76. The piston 74 is movable upward in the cylinder 72 against a bias of the spring 76. An output member 80 is fixed to the piston 74 and projects outward from an upper end of the cylinder 72. A joint 82 at the lower end of the cylinder 72 connects the cylinder 72 pivotally to the back portion 20 of the frame 18. A joint 84 at the upper end of the output member 80 connects the output member 80 pivotally to the lever arm 50 at the lower end portion 54 of the lever arm 50.

The piston/cylinder assembly 70 has a source 90 of energy for moving the piston 74. The source 90 of energy in the first embodiment of the present invention is an electrically actuatable squib with a casing 92 containing a small charge 94 of pyrotechnic material. The charge 94 of pyrotechnic material is ignited in a known manner upon the passage of electric current through the squib 90 between a pair of electrical leads 96 projecting from the casing 92. When the charge 94 of pyrotechnic material is ignited, it rapidly produces combustion products including hot gases which are spewed outward from the casing 92. The combustion products develop a thrust which moves the piston 74 upward in the cylinder 72. The piston 74 then moves the output member 80 outward of the cylinder 72 from the position of FIG. 1 to the position of FIG. 2.

When the output member 80 moves outward of the cylinder 72, it moves the lever arm 50 longitudinally upward relative to the back portion 20 of the frame 18. The slot 57 in the lever arm 50 imparts rearward movement to the intermediate and lower portions 56 and 54 of the lever arm 50 as the lower pin 62 slides relatively downward in the slot 57. The oppositely inclined slot 63 in the bracket 58 simultaneously imparts forward movement to the upper end portion 52 of the lever arm 50 as the upper pin 58 slides upward in the slot 63. The upper end portion 52 of the lever arm 50 then carries the headrest 14 forward.

When a crash force acts against the vehicle in a forward direction, an occupant of the seat 12 may experience inertial movement relative to the seat 12 in a rearward direction. When a crash force acts against the vehicle in a rearward direction, an occupant of the seat 12 may first experience inertial movement relative to the seat 12 in a forward direction, and may subsequently experience rebound movement in a rearward direction. The occupant's head may thus move relative to the seat 12 in a rearward direction upon the occurrence of either a rear-end crash or a frontal crash. Therefore, the linkage 16 is actuatable in accordance with the present invention so as to move the headrest 14 forward upon the occurrence of either a rear-end crash or a frontal crash.

As indicated by the arrow shown in FIG. 2, an occupant of the seat 12 may apply a rear-end vehicle crash force F to the linkage 16. Specifically, the occupant may apply the crash force F to the lever arm 50 by deflecting the back cushion 30 rearwardly against the intermediate portion 56 of the lever arm 50. If the crash force F meets or exceeds a predetermined threshold level, it will move the intermediate portion 56 of the lever arm 50 rearwardly to the position of FIG. 2 against the bias of the spring 76 in the piston/cylinder assembly 70. The oppositely inclined orientations of the slot 57 and 63, as described above, will impart a corresponding amount of forward movement to the upper end portion 52 of the lever arm 50 to move the headrest 14 forward to the position of FIG. 2. The spring 76 will move the lever arm 50 and the headrest 14 back to the positions of FIG. 1 as the crash force F is dissipated.

As shown schematically in FIG. 4, other parts of the apparatus 10 include an electronic controller 100 and at least one crash sensor 102. The crash sensor 102 is a known device that senses vehicle conditions indicating the occurrence of a crash. The controller 100 uses known algorithms to discriminate a frontal crash condition sensed by the crash sensor 102. Such a frontal crash condition may be of a predetermined level for which forward movement of the headrest 14 is desired to help protect an occupant of the seat 12. If so, the controller 100 responds by causing an actuating level of electric current to be directed through the squib 90 in the piston cylinder/assembly 70. This actuates the piston cylinder/assembly 70 which, in turn, actuates the linkage 16 in the manner described above.

Figure 5:
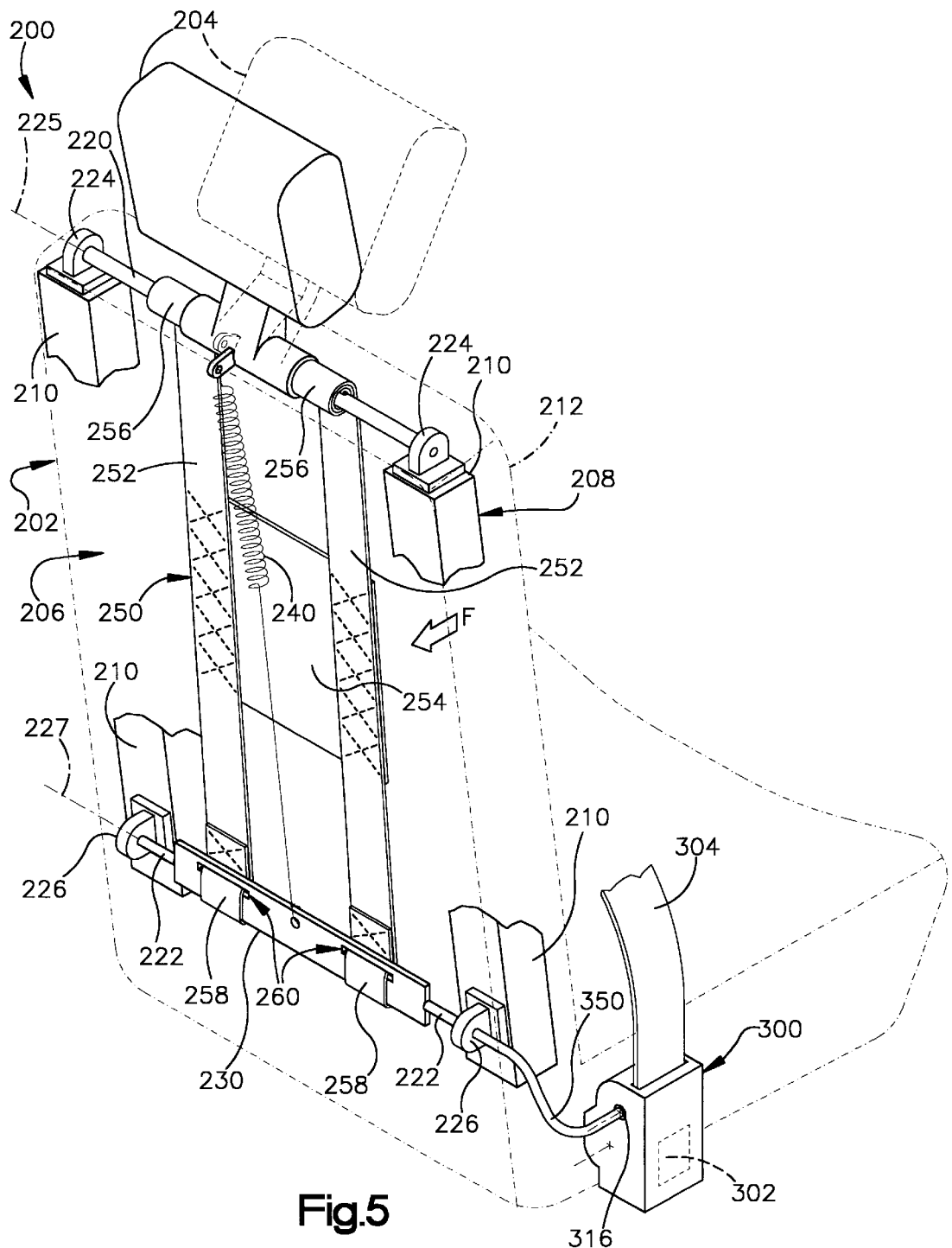
FIG. 5 is a view of an apparatus comprising a second embodiment of the invention.

An apparatus 200 comprising a second embodiment of the present invention is shown partially in FIG. 5. The apparatus 200 also comprises a vehicle seat 202, a headrest 204 on the seat 202, and a linkage 206 supporting the headrest 204 for movement in a forward direction to help restraint rearward movement of the head of an occupant of the seat 202. Like the linkage 16 described above, the linkage 206 is actuatable under the influence of a rear-end vehicle crash force applied by the occupant of the seat, and is further actuatable in response to a frontal crash condition.

The seat 202 has a frame 208 with a back portion 210 covered by a back cushion 212 (shown schematically). The linkage 206 includes an upper shaft 220 and a pair of lower shafts 222. A pair of upper bearings 224 support the upper shaft 220 on the back portion 210 of the frame 208 for rotation about a horizontal upper axis 225. A pair of lower bearings 226 support the lower shafts 222 on the back portion 210 of the frame for rotation about a lower axis 227 parallel to the upper axis 225. A flat, rectangular connector bar 230 interconnects the lower shafts 222 along the lower axis 227.

The headrest 204 is mounted on the upper shaft 220 so as to pivot about the upper axis 225 upon rotation of the upper shaft 220. The headrest 204 is thus movable back and forth between the rearward and forward positions respectively shown in solid and dashed lines in FIG. 5. A spring 240 acts between the headrest 204 and the connector bar 230 to retain the headrest 204 normally in the rearward position.

The linkage 206 further includes an actuator structure 250 extending vertically between the upper shaft 220 and the connector bar 230. The actuator structure 250 includes a pair of straps 252 and an actuator panel 254. Upper end portions 256 of the straps 252 are wound on the upper shaft 220 at opposite sides of the headrest 204. Lower end portions 258 of the straps 252 extend through slots 260 in the connector bar 230, and are fastened around the connector bar 230 in closed loops. The straps 252 are thus fastened to the connector bar 230 such that rotation of the connector bar 230 about the lower axis 227 tends to wind the straps 252 onto the connector bar 230.

An occupant of the seat may transmit a rear-end vehicle crash force F to the actuator panel 254 through the back cushion 212, as indicated by the arrow shown in FIG. 5. This would impart tension to the straps 252 by deflecting the actuator structure 250 rearwardly relative to the back portion 210 of the frame 208. Such tension in the straps 252 would unwind the upper end portions 256 of the straps 252 so as to rotate the upper shaft 220 in a clockwise direction, as viewed in FIG. 5, and thereby to pivot the headrest 204 forward against the bias of the spring 240. Like the spring 76 described above, the spring 240 returns the headrest 204 to its rearward position as the crash force F is dissipated.

Further in accordance with the present invention, the apparatus 200 includes a seat belt pretensioner 300 comprising a motor 302 for actuating the linkage 206. The pretensioner 300 is a known device that imparts tension to seat belt webbing 304 to help restraint an occupant of the seat 202 upon the occurrence of a vehicle crash.

Figure 6:
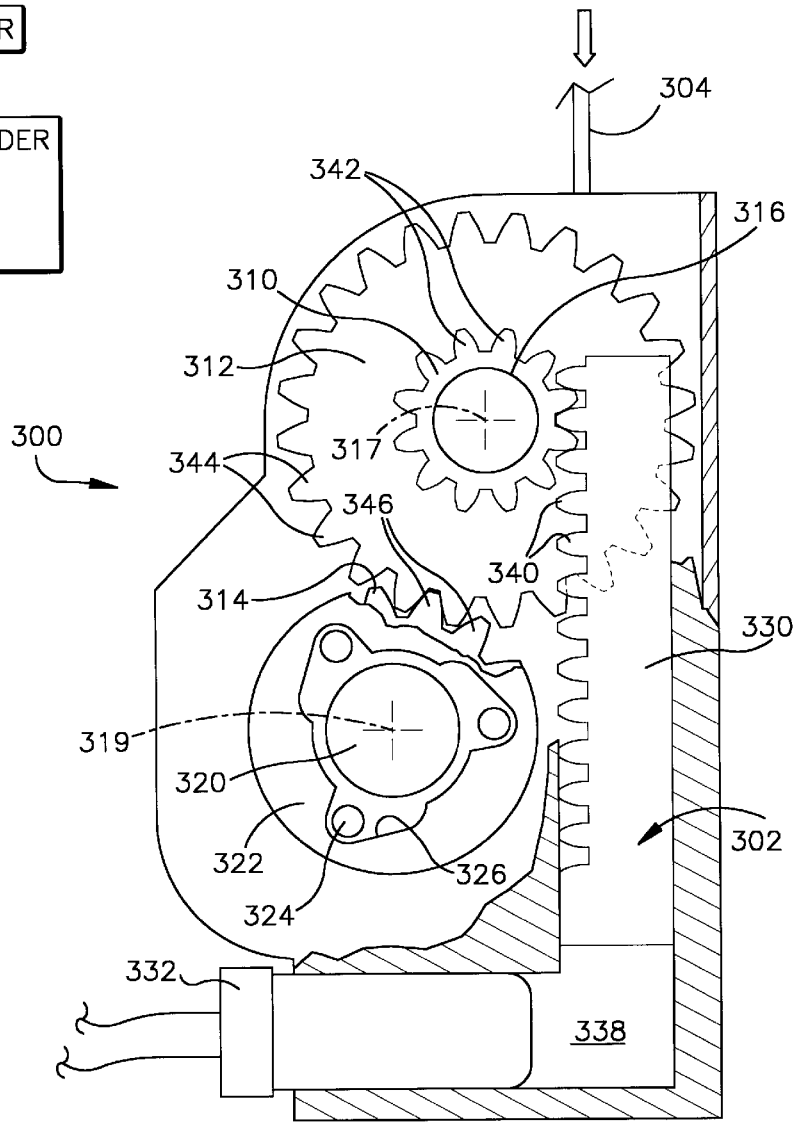
FIG. 6 is an enlarged, partly sectional view of parts of the apparatus of FIG. 5.

As shown in greater detail in FIG. 6, the pretensioner 300 is a particular type of pretensioner which includes first, second, and third gears 310, 312 and 314. The first and second gears 310 and 312 are mounted on a shaft 316 to rotate about an axis 317 with the shaft 316. The third gear 314 is supported for rotation about an axis 319 spaced from the axis 317.

The webbing 304 is wound on a retractor spool 320 which is centered on the axis 319. A coupling device 322 is operatively connected between the third gear 314 and the spool 320. As known in the art, the coupling device 322 includes a plurality of rollers 324 and a corresponding plurality of cam surfaces 326. When the third gear 314 is rotated about the axis 319 in a clockwise direction, as viewed in FIG. 6, the cam surfaces 326 move the rollers 324 forcefully against the spool 320 to establish a rotational driving connection between the third gear 314 and the spool 320.

Figure 7:
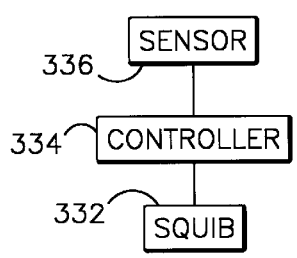
FIG. 7 is a block diagram of parts of the second embodiment of the invention.

The motor 302, which is shown schematically in FIG. 5, includes a piston 330 (FIG. 6) and an electrically actuatable squib 332. Like the squib 90 described above, the squib 332 is actuated by a controller 334 (FIG. 7) when a crash sensor 336 senses one or more vehicle conditions indicating the occurrence of a crash for which use of the pretensioner 300 is desired to impart tension to the webbing 304. Such crash conditions include both frontal and rear-end crash conditions, as known in the art.

When the squib 332 is actuated, it spews pyrotechnic combustion products into a chamber 338 between the squib 332 and the piston 330. The combustion products in the chamber 338 develop a thrust which moves the piston 330 upward. Gear teeth 340 on the piston 330 then move against meshing gear teeth 342 on the first gear 310 so as to rotate the shaft 316 and the first and second gears 310 and 312 about the axis 317 in a counterclockwise direction, as viewed in FIG. 6. Gear teeth 344 on the second gear 312 are thus driven against meshing gear teeth 346 on the third gear 314 so as to rotate the third gear 314 in the clockwise direction. This causes the coupling device 322 to rotate the spool 320 in the clockwise direction. Such rotation of the spool 320 imparts tension to the webbing 304 by winding the webbing 304 further onto the spool 320.

As shown in FIG. 5, the linkage 206 includes a flexible coupling 350. The coupling 350 comprises a cable extending from the shaft 316 in the pretensioner 300 to the lower shaft 222 in the seat 202. When the piston 330 rotates the shaft 316 upon actuation of the squib 332, the coupling 350 imparts simultaneous rotation to the lower shaft 222 and the connector bar 230. As noted above, rotation of the connector bar 230 tends to wind the straps 252 onto the connector bar 230. This causes the straps 252 to unwind from the upper shaft 220, and thereby to rotate the upper shaft 220 so as to pivot the headrest 204 forward against the bias of the spring 240.

From the foregoing description of the invention, those skilled in the art will perceive improvements, changes and modifications. Such improvements, changes and modifications within the skill the of the art are intended to be covered by the appended claims.

Having described the invention, the following is claimed:

1. Apparatus comprising:

a vehicle seat including a frame and a headrest;

a linkage connected between said frame and said headrest to move said headrest relative to said frame in a forward direction, said linkage being actuatable under the influence of a rear-end vehicle crash force applied to said linkage by an occupant of said seat;

a motor connected to said linkage to actuate said linkage; and means for actuating said motor in response to a frontal vehicle crash condition.

2. Apparatus as defined in claim 1 wherein said motor comprises a piston, a pyrotechnic source of energy for moving said piston, and an output member operatively connected between said piston and said linkage.

3. Apparatus as defined in claim 2 wherein said piston is part of a seat belt pretensioner which imparts tension to seat belt webbing in response to movement of said piston.

4. Apparatus as defined in claim 3 wherein said pretensioner comprises a gear which rotates a seat belt retractor spool in response to movement of said piston, said output member being rotatable with said gear.

5. Apparatus as defined in claim 4 wherein said linkage comprises a flexible coupling between said output member and a rotatable part of said linkage.

6. Apparatus as defined in claim 5 wherein said flexible coupling comprises a cable.

7. Apparatus as defined in claim 1 wherein said linkage comprises an upper bearing supporting said headrest for pivotal movement against the bias of a spring, a lower member supported for rotation under the influence of said motor, and a vertically extending actuator structure interconnecting said headrest and said lower member so as to pivot said headrest upon rotation of said lower member.

8. Apparatus as defined in claim 7 wherein said actuator structure is connected to said headrest so as to pivot said headrest under the influence of said rear-end vehicle crash force.

9. Apparatus as defined in claim 8 wherein said actuator structure comprises a pair of vertically extending straps and an actuator panel suspended by and between said straps.

* * * * *